United States Patent Office 2,882,245
Patented Apr. 14, 1959

2,882,245

PROCESS FOR PRODUCTION OF A CATALYST OF THE PLATINUM-ALUMINA TYPE

Heinz Heinemann, Swarthmore, and Harold Shalit, Drexel Hill, Pa., assignors to Houdry Process Corporation, Wilmington, Del., a corporation of Delaware No Drawing. Application July 18, 1955
Serial No. 522,882

2 Claims. (Cl. 252—455)

This invention relates to the production of catalysts useful in treating hydrocarbons and particularly in the reforming of naphthas. Still more particularly the invention is concerned with the production of improved reforming catalysts of the type comprising a noble metal of group VIII of the periodic table, such as palladium or platinum or both, on an alumina support.

Catalysts particularly useful in reforming hydrocarbons have a dual- or poly-function; i.e., they have the ability of hydrogenating and dehydrogenating, isomerizing and dehydroisomerizing, hydrocracking and effecting dehydrocyclization of hydrocarbons. Known catalysts of this dual- or poly-function type consist of a noble metal, particularly platinum, deposited on an activated alumina support. The noble metal part of the combined catalyst primarily has a dehydrogenating activity while the alumina support in conjunction with acid added with the solution of the noble metal compound, or separately, will exert isomerizing effect.

It has also been proposed to prepare catalysts of similar type with the use of a silica-alumina support for the noble metal. Known catalysts of this type are prepared, for example, by impregnating a pelleted silica-alumina support with a chloroplatinic acid solution thereby depositing a suitable platinum compound on said support, and reducing this compound to metallic platinum, as with hydrogen, either before or during the employment of the catalyst in hydrocarbon reforming operations. Such catalysts, however, show the great disadvantage that their acid activity is too high and that, consequently, undesirably high cracking is effected thereby.

It has now been found that it is possible to prepare a noble metal alumina reforming catalyst which also contains silica, but does not show the above-mentioned drawback of the known platinum-silica-alumina catalysts. On the contrary, the improved catalyst produced in accordance with the present invention has a dehydrogenation activity at least as high as that of a catalyst prepared in normal manner by depositing platinum on an alumina support, and, in addition, has the required acid function generally demonstrated in good isomerizing and relatively low cracking activity. The improved catalyst, moreover, retains the desired acid activity during prolonged use without the necessity of halogen addition required in treating water-containing feeds by means of known platinum-alumina-halide catalysts as, for example, described in U.S. Patent No. 2,479,110.

It is, therefore, a main object of the present invention to prepare a hydrocarbon reforming or dual-function platinum-alumina catalyst which, while containing silica, will have and will retain the desired acid activity during use without the addition of halogen or hydrogen halide.

And it is another object of this invention to prepare dual-function catalysts which, in contrast to known platinum-alumina-halide catalysts, will retain their acid activity even in the presence of some water.

Other objects and advantages of the invention will appear from the following specification and the annexed claims.

According to the present invention, a hydrocarbon reforming or dual-function catalyst with high dehydrogenation activity and suitable acid activity is obtained by incorporating minor amounts of silica into a platinum group alumina catalyst. This may be achieved in accordance with the invention by treating a pelleted or otherwise shaped noble metal alumina catalyst, prepared in a usual manner, or otherwise, by the deposit of a noble metal of group VIII of the periodic table on an active alumina support, with a suitable inorganic or also an organic silicon compound, particularly with a gasified silicon halide, such as silicon chloride, silicon fluoride, or silicon bromide, at elevated temperature. Suitably, the gasified silicon compound is diluted with an inert or reducing gas, and most effectively with hydrogen. Other diluting gases inert to the platinum metal of the catalyst may, however, also be used. The silicon halide or the like may react with hydroxyl groups present in the alumina support and/or in the deposited noble metal compound. Silica is, thus, deposited in finely divided state in and on the catalyst pellets or the like and apparently in close proximity to particles of the platinum group metal of said catalyst. The silicon compound thus added generally shows some tendency to decrease in concentration from the outer portion of the catalyst particles toward the center thereof. This condition is generally similar to that existing with the distribution of the platinum incorporated in the alumina particles.

The dual-function catalyst obtained in accordance with the present invention has, so to say, a built-in acid function. In the reforming of hydrocarbons, the new catalyst not only shows unimpaired dehydrogenation activity during long periods of use, but also an enhanced but not too strong acid activity. The new catalyst, moreover, does not require further addition of halide to maintain its full acid activity as the acid function in this case is fixedly built in the catalyst.

One of the major advantages of the improved catalyst is its ability to tolerate small amounts of water in the feed without any ill effect. In contrast thereto, catalysts of the platinum-alumina-halide type rapidly lose in acid activity when exposed to water-containing feed stocks due to hydrolysis of the halide and escape of halogen.

Of the silicon compounds useful in the preparation of the improved catalyst, silicon tetrachloride ($SiCl_4$) is preferred, but silicon tetrafluoride and silicon tetrabromide can also be used.

The treatment of the noble metal alumina preparation with a silicon tetrahalide is best carried out in such a manner that the silicon tetrahalide is vaporized into a carrier gas stream consisting preferably of hydrogen at temperature and pressure conditions suitable to give the desired vapor pressure of silicon tetrahalide to permit a suitable concentration of silicon tetrahalide in the gas mixture. This concentration should preferably be such that a deposit of between about 0.5% and about 10% by weight of silica on the catalyst, and preferably in the range of 1 to 5%, is obtained within a period of time of about fifteen minutes to about five hours. A temperature in the approximate range of about 400° F. to 1000° F. may be employed in depositing the silica on the platinum-alumina type catalyst. It is of importance that the diluting carrier gas for the silicon halide be free of such compounds which might damage the catalyst and its activity, and it is particularly for this reason that hydrogen free of oxygen, oxygen-containing compounds, sulfur compounds, and the like is best suited for this purpose.

The general outlines of the preparation of a catalyst in accordance with the present invention thus are about the following:

A dual-function catalyst is formed from alumina which has been shaped by extrusion or otherwise to granules, pellets or the like followed by heating to effect dehydration, and leaching with a suitable acid to remove most of any alkali metal compounds therein. After washing and drying, the alumina is impregnated with a solution of a suitable compound of a noble metal of group VIII of the periodic table, preferentially of platinum and/or palladium, e.g., with an aqueous solution of chloroplatinic acid, in such a manner that a concentration of the noble metal of about 0.1% to about 4% by weight of the alumina carrier is obtained. The resulting catalyst after drying is reduced at elevated temperature in flowing hydrogen. Thereafter, the catalyst may be steamed in a hydrogen-containing reducing atmosphere and in the absence of all oxygen-containing compounds except water. Compounds poisonous for platinum and the like, such as carbon monoxide, hydrogen sulfide, and the like, are also to be avoided in the steaming operation. This steaming of the catalyst is desirable to hydrolyze and to remove the bulk of any hydrolyzable acid agent, e.g., the halogen, present. The steaming may, for example, be carried out with a mixture of about 25–75% steam and about 10–75% hydrogen at temperatures in the range of about 600–1000° F. and preferably of about 800° F. to about 950° F. for a period of time of about 1 to 36 hours. The effectiveness of halogen removal is increased, generally, with longer treating times. At least two volumes of water as steam per volume of catalyst per hour are preferably used in the steam treating operation. By this treatment, the chloride content of the catalyst can be reduced to less than 0.1%. While the acid function of the catalyst will be seriously impaired by the removal of most of the halide, the dehydrogenating function remains fully active. This may be tested by the ability of the catalyst thus treated to convert cyclohexane to benzene to thermodynamic equilibrium at the rather stringent conditions set forth in Table II hereinafter.

The steam treated product obtained, which is preferably always retained in an inert or reducing atmosphere as long as it is at an elevated temperature, is then subjected to treatment with a silicon halide of the group comprising silicon tetrachloride, silicon tetrafluoride, and silicon tetrabromide. A carrier gas, which preferably consists of hydrogen, is employed to dilute and transport the vaporized silicon halide in a desired degree. As mentioned before, the silicon halide is preferably vaporized into the carrier gas stream at a temperature and pressure such that a suitable and desired vapor pressure of silicon tetrahalide is obtained which will permit a concentration of silicon tetrahalide in the gas mixture suitable to make possible the deposit of about 0.5% to about 10% by weight of silica on the catalyst within about 15 minutes to about two hours. A temperature of about 700° F. to 1000° F. is preferably maintained during this treatment. The treated catalyst is thereafter cooled in an inert or reducing atmosphere to normal temperature. A catalyst obtained by such a treatment of alumina will contain between about 0.1% to 4% of platinum or other noble metal and silicon oxides, oxyhalides, and halides between about 0.5% to 10%, by weight, measured as silica. The halide content of the catalyst will correspond to between about one-tenth and one-half of the theoretical amount of halide that should be on the catalyst if all the halide originally associated with the silica deposited on the alumina noble metal preparation had been retained thereon.

The catalyst thus obtained may be used without further treatment. In this case, the residual halide content of the catalyst may be removed or substantially decreased in the course of the initial hydrocarbon reforming operation. It is, however, preferable again to steam the catalyst in order to hydrolyze all halide present to less than about 0.1% by weight of the catalyst. By this treatment, the danger of an overly active cracking function of the catalyst with inherent coke formation during the initial phases of a reforming operation is avoided. Such steaming may be carried out under about the same conditions as that done before the treatment with silicon halide.

While the dehydrogenating activity of the platinum or other noble metal content of the catalyst remains unimpaired in this treatment, as may be measured by the ability to convert cyclohexane to benzene at the conditions described in Table II hereinafter, any acid activity of the improved catalyst in accordance with the present invention must derive primarily from silica-alumina formed by the treatment in view of the very low halide content of the steamed catalyst.

It is also possible to omit the first steaming operation carried out after the deposit of the platinum or the like on the alumina support so that the catalyst is steam treated only once, viz., after the treatment with silicon halide. In this case, this finishing treatment by steam simultaneously serves for removing a substantial part of the halogen introduced on impregnating the alumina support with chloroplatinic acid or the like as well as of that introduced with the silicon halide; however, the same degree of effectiveness may not necessarily be attained.

EXAMPLE I

An activated alumina of commerce in the form of cylindrical pellets was leached with a dilute acetic acid solution of about 10% concentration for two periods of about one hour each in order to remove at least a substantial part of any alkali metal compounds present. After draining the acid and rinsing the treated pellets repeatedly with distilled water, they were air dried and then calcined by treatment with bone-dry air at a temperature of about 1300° F. for about one hour. The calcined pellets after cooling were impregnated with a chloroplatinic acid solution of a concentration such as to obtain on the alumina pellets a platinum concentration of about 0.5% by weight and a chloride concentration of about 0.5% by weight. The resulting catalytic material was reduced in flowing hydrogen at 900° F. and then steamed in a reducing atmosphere free of platinum poisoning compounds, such as carbon monoxide, hydrogen sulfide, and the like, and of all oxygen-containing compounds other than water. A mixture of about 75% steam and about 25% hydrogen was employed for this hydrolyzing operation of the chloride of the catalyst at a temperature of about 875° F. for about two hours. About three volumes of water as steam per volume of catalyst per hour were employed.

The steam treated catalyst, which was retained in a reducing atmosphere, was subjected to a treatment at a temperature of about 900° F. with silicon tetrachloride vaporized into a hydrogen gas stream under conditions such that the vapor pressure of the silicon tetrachloride was sufficient to result in a deposit of about 3% by weight of silica on the catalyst within about one hour. The catalyst was then cooled in a reducing atmosphere to room temperature.

The catalyst obtained was again steam treated in the manner described before in order to remove most of the chlorine ions present and to reduce the value thereof in the catalyst to less than 0.1% by weight thereof.

EXAMPLE II

A catalyst prepared in accordance with the above-described Example I was tested in the catalytic reforming of an East Texas straight run naphtha boiling in the range of about 250° F. to 400° F. and having an octane number of 40 F–1 clear. This naphtha contained about 44% naphthenes, about 15% aromatics, and about 41% paraffins. The operating conditions employed were: temperatures of 875° F. to 975° F., pressure of about 500 pounds per square inch, liquid hourly space rates of 3 vol./vol./hr., and a hydrogen to naphtha ratio of 6:1. The following typical yields and octane numbers were obtained at different temperatures within this range: 82% by volume of $C_5+$ motor gasoline having the octane number 80 F-1 clear, 78% by volume $C_5+$ of 90 F-1 clear, 74% by volume of $C_5+$ of 95 F-1 clear, and 70% by volume $C_5+$ of 97 F-1 clear.

These data check those obtained with a good platinum-alumina-halide catalyst. Slightly higher octane numbers are obtained, however, with the improved new catalyst at any suitable operating conditions tested. Less severity of operation, therefore, is required with the new catalyst in accordance with the present invention in order to obtain corresponding yields and octane numbers.

EXAMPLE III

A platinum-alumina catalyst prepared in the manner described in Example I was heated to about 900° F., hydrogenated for half an hour at atmospheric pressure and treated with a mixture containing about 50 mole percent of hydrogen and 50 mole percent of water for one hour. The catalyst after this treatment contained 0.16% of chlorine and had a cyclohexane activity of 76.5 (cyclohexane was converted to 76.5% benzene at treating conditions as described in Table II, hereinafter). The material thus obtained was maintained at about 900° F. Hydrogen at the rate of two cubic feet per hour per ounce of catalyst was bubbled through silicon tetrachloride maintained at —50° C. and then passed over the steamed catalyst for three hours. The resulting catalyst was evaluated as dual-function catalyst under the following conditions: charge of heavy East Texas naphtha as in Example II, temperatures of about 925° F. and about 950° F., pressure of 600 p.s.i.g., space velocity of 4 vol./vol./hr. (volumes of oil as liquid per volume of catalyst per hour), and hydrogen/oil mole ratio of 6. The $C_5+$ motor gasoline from these runs had octane numbers of 88.9 F-1 clear and 92.7 F-1 clear, respectively. The used catalyst from this run contained 5.01% silica and 0.18% chlorine.

EXAMPLE IV

A platinum-alumina catalyst as that subjected to treatment in Example II was heated to about 900° F., hydrogenated, and steamed with a mixture of about 66.7 mole percent of water and 33.3 mole percent of hydrogen. The steaming operation lasted four hours. The resulting material contained about 0.1% chlorine. This material was then treated with the same hydrogen-silicon tetrachloride mixture as employed in Example III, except that the treatment was continued only for one-quarter of an hour. The catalyst was cooled in hydrogen, and analysis of the cooled catalyst showed it contained about 1.5% of silica and about 0.9% of chlorine. When used in reforming reactions under the same conditions as named in Example III, this material gave at temperatures of 925° F. and 950° F. motor gasoline with the octane numbers 81.4 F-1 clear and 85.7 F-1 clear, respectively.

The acid function of the new catalyst may be increased or decreased to some degree by controlling the amount of silica deposited on the catalyst in accordance with the new process. This effect is demonstrated in part by the different results set forth in Examples II, III, and IV above.

As has been stated before, the new catalyst shows the great advantage that, in contrast to normal platinum-alumina-halide type catalysts, it tolerates small amounts of water in the feed without lasting damage to its activity. The difference between these two types of catalysts in the presence of water is shown in Table I. Here, the results are compared which were obtained in the presence of both said types of catalysts in reforming East Texas naphtha of the above-named properties at a temperature of 950° F., a pressure of 600 pounds per square inch, a liquid hourly space rate of 4, and a hydrogen to oil ratio of 6 moles. After an initial break-in operation of six hours, an amount of about 0.5% water by weight of the charge was introduced in both comparative runs with the feed for further six hours. Thereafter, both runs were continued with dry feed stock for another period of six hours. Though this amount of added water is tremendously large compared to the amount of water which may normally be encountered in reforming operations, it has been used to show the different effects of water on the activity of both types of catalysts in a short-term test.

The final period of six hours without further addition of water was insufficient to permit full recovery of the new catalyst. The results obtained with the new catalyst would, therefore, have been still more striking if the runs without addition of more water had been continued for a longer period of time, as is shown by the fact that the yield in aromatics and the octane number were still rising at the end of the six-hour recovery period, in contrast to the case of the use of the normal platinum-alumina-halide type catalyst.

Table I

|  | With Catalyst (A) | | With Catalyst (B) | |
|---|---|---|---|---|
|  | Percent Aromatics in Product | Octane No. F-1 Clear | Percent Aromatics in Product | Octane No. F-1 Clear |
| Initial Period (Without Water) | 61 | 92 | 61 | 92 |
| Water Addition Period | 56 | 89 | 52 | 87 |
| Final Period (Without Water Addition) | 59 | 91 | 52 | 82 |

The figures of Table I strikingly show the difference of effect obtained with both types of catalysts, that (A) prepared in accordance with Example III and a normal dual-functional platinum-alumina-chloride catalyst (B). While the new catalyst substantially regains its original activity within a certain period of time after the effect of the addition of water has ceased, the normal platinum-alumina-chloride catalyst has been permanently harmed by said addition and does not recover after the water addition has ceased.

In Table II a comparison is made between the dehydrogenation activity of a normal platinum-alumina catalyst obtained by impregnating acetic acid leached alumina with chloroplatinic acid; normal silica-alumina cracking catalyst steam treated to reduce its cracking activity (activity index=A.I.) and then impregnated with chloroplatinic acid; and a catalyst prepared in accordance with the present invention. All of the catalysts contain substantially equal amounts of platinum.

Table II.—Cyclohexane conversion
[Temp.—650° F., Press.—Atmospheric, LHSV—6, $H_2$/Oil Mole Ratio—4.]

| Catalyst Description | Vol. Percent Benzene in Product |
|---|---|
| 0.5% Pt (ex $H_2PtCl_6$) on Acetic Acid Leached Alumina | 70 |
| 0.5% Pt (ex $H_2PtCl_6$) on $SiO_2$ (88.5%)—$Al_2O_3$ (12.5%) Cracking Catalyst Steamed to 10 A.I. | 33 |
| 0.5% Pt (ex $H_2PtCl_6$) on $SiO_2$ (88.5%)—$Al_2O_3$ (12.5%) Cracking Catalyst Steamed to 16 A.I. | 38 |
| 0.5% Pt Catalyst Prepared According to the Present Invention | 75 |

Table II shows that the dehydrogenation activity of the improved catalyst is at least as high as that of the normal platinum-alumina catalyst, while the corresponding activity of platinum on silica-alumina cracking catalyst is substantially smaller, in fact about half as high as that of the two other catalysts. In other words, the dehydrogenation activity of platinum added on silica-alumina cracking catalyst is substantially lower than that of platinum-alumina catalyst treated with silicon halide.

Table III shows compartive results obtained with the use of a regular platinum-alumina-halide catalyst (B) and a catalyst (A) prepared in accordance with Example III above after both these types of catalyst had been subjected to a steam treatment in the presence of hydrogen but in the absence of hydrocarbons. These steam treatments were similar to those described above and carried out during the preparation of the new catalyst. Both these catalyst preparations were tested in the reforming of the same type of naphtha as described before at a temperature of 950° F., a pressure of 600 pounds per square inch, a hydrogen to oil mole ratio of 6, and a liquid hourly space rate of 4. The superiority of the steam treated new catalyst (A) over the normal platinum-alumina-halide catalyst (B) is clearly to be seen from this table.

*Table III*

|  | With Catalyst (A) Steamed | With Catalyst (B) Steamed |
|---|---|---|
| $C_5+$ Yield, vol. percent | 77 | 84 |
| Octane Number, F-1 Clear | 91 | 82 |

Reference is made to the application of Heinz Heinemann and Harold Shalit entitled Hydrogenation Catalyst, Serial No. 521,907, filed July 13, 1955, of which this is a continuation-in-part.

Numerous variations of the process of the present invention here described may be made without departing from the spirit and scope as defined in the annexed claims.

What we claim is:

1. In a process for preparing a pelleted catalyst from an active alumina support and a compound of a metal of the platinum group deposited on said support, the improvement of which comprises treating pellets of said alumina supported platinum-group catalyst with a gasified silicon halide compound of the group consisting of silicon chloride, silicon fluoride, and silicon bromide, and thereafter steaming said catalyst at 600–1000° F.

2. The method of preparing a poly-function catalyst useful in the treatment of hydrocarbons, which comprises depositing in acid-leached activated alumina 0.1 to 4.0% by weight of a noble metal of group VIII of the periodic table by impregnation with a halogen-containing compound of said noble metal; said impregnated alumina being thereafter successively subjected to: (1) reducing conditions, (2) treatment with a steam-containing gas for 1 to 5 hours at a temperature in the range of 600° F. to 1000° F., said steam being introduced in an amount equal to at least two volumes of steam per volume of said impregnated alumina per hour, (3) treatment for 15 minutes to two hours at a temperature in the range of 700° F. to 1000° F. with a gas comprising essentially hydrogen and silicon tetrachloride present in a concentration to deposit on said impregnated alumina between about 0.5 to 10% silicon compound calculated as silica, and (4) further treatment with steam at elevated temperature to hydrolyze the silicon tetrachloride and to remove substantially all chloride from the catalyst, providing a final catalyst containing less than 0.2% halide by weight.

References Cited in the file of this patent

UNITED STATES PATENTS

| 2,483,131 | Garrison | Sept. 27, 1949 |
| 2,519,622 | Archibald et al. | Aug. 22, 1950 |
| 2,550,531 | Ciapetta | Apr. 24, 1951 |
| 2,662,860 | Engel et al. | Dec. 15, 1953 |
| 2,662,861 | Riblett et al. | Dec. 15, 1953 |